United States Patent Office 2,788,733
Patented Apr. 16, 1957

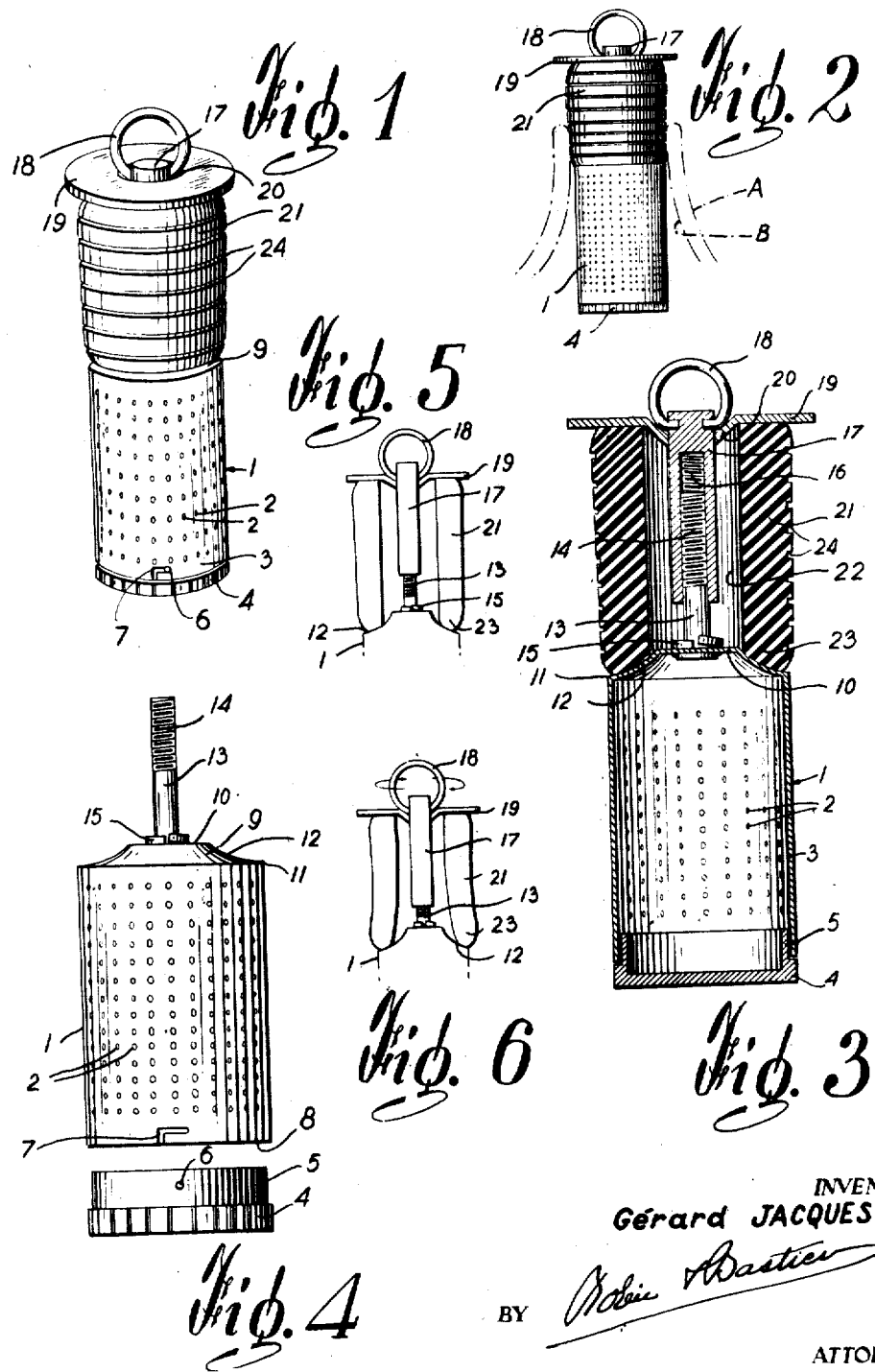

2,788,733

COMBINED STOPPER AND TEA LEAF CONTAINER

Gerard Jacques, Noranda, Quebec, Canada

Application August 8, 1955, Serial No. 527,085

1 Claim. (Cl. 99—323)

The present invention relates to means for making tea and more particularly to a combined stopper and tea container adapted to infuse tea in a thermos bottle and also to close the latter.

One known manner of making tea in a thermos bottle or similar vessel is to insert tea bags into the thermos bottle and to pour boiling water on the tea bags and thereafter to stop the thermos bottle. This method of making tea in a thermos bottle has several disadvantages, amongst other the fact that the amount of tea is predetermined by the bags and, therefore, one cannot make the tea to the exact strength desired, and moreover tea bags are usually more expensive than loose tea. Another disadvantage resides in the fact that it is often difficult to extract spent tea bags from the thermos bottle due to the restricted neck of the latter.

Accordingly the general object of the present invention is the provision of means to make tea in a thermos bottle or the like which eliminates the above mentioned disadvantages.

An important object of the present invention is the provision of a combined stopper and tea leaf container whereby loose tea may be inserted into the container and the latter inserted into the water filled thermos bottle to infuse the tea, the bottle being tightly closed by the stopper combined with the container so as to replace the conventional closure of the thermos bottle.

Yet another important object of the present invention is the provision of a device of the character described provided with means to positively lock the stopper in closed position within the thermos bottle whereby the stopper, even when made of rubber, will not pop off the thermos bottle under pressure.

Still another important object of the present invention is the provision of a device of the character described in which the tea leaf container has a closure which may be readily opened for inserting or removing the tea.

Yet another object of the present invention is the provision of a device of the character described which can be easily cleaned.

Still another important object of the present invention is the provision of a device of the character described which is relatively simple and inexpensive to manufacture and which will give a prolonged service.

The foregoing and other important objects of the present invention will become more apparent during the following disclosure and by referring to the drawings in which:

Figure 1 is a perspective view of the combined stopper and tea leaf container;

Figure 2 is an elevation of the same in position in the spout of a thermos bottle shown in dot and dash lines;

Figure 3 is a longitudinal section of the device;

Figure 4 is an elevation of the tea leaf container with its closure removed; and Figures 5 and 6 are diagrammatic elevations of the stopper portion of the device shown in two different positions.

Referring now more particularly to the drawings in which like reference characters indicate like elements throughout, the device comprises a cylindrical tea leaf container 1 having a plurality of perforations 2 made in the cylindrical wall 3 thereof. The lower end of the container 1 is open for filling and emptying the container, said opening being closed by a knurled closure 4 having a restricted portion 5 adapted to engage within the container 1, and which is provided with opposed pins 6 adapted to engage the L-shaped slots 7 made at the lower edge 8 of the container. The pins 6 and slots 7 constitute a bayonet joint for quick opening and closing of the container.

The upper end of the container 1 is closed by an imperforate dome-shaped top wall 9 which consists of a circular, flat, apertured, central portion 10 higher than the upper edge 11 of the cylindrical wall 3, and connected to said upper edge 11 by an inclined annular portion 12 which is slightly concave.

A bolt 13, which is threaded at its upper portion 14, passes through the apertured central portion 16 of the top 9 and is secured thereto by means of a lock washer 15 which prevents rotation of said bolt 13 relative to the container 1. The threaded upper portion of the bolt 13 is adapted to engage the inner threaded bore 16 of the sleeve 17, which is provided at its upper end with an actuating ring 18. A metal cover 19, consisting of a perforated disk provided with a central, recessed, apertured portion 20, is adapted to abut against the upper end of a cylindrical stopper 21 having a central bore 22 through which extend the bolt 13 and sleeve 17. The stopper 21 is made of resilient material such as rubber, and its outer face is provided with a plurality of circular grooves 24. The lower end 23 of said stopper abuts against the concave annular portion 12 of the tea leaf container 1.

Rotation of the sleeve 17 by means of the ring 18 to screw said sleeve on the bolt 13, results in the squeezing of the rubber stopper 21 between the cover 19 and the top wall 9 of the container 1. This causes the lower portion 23 of the stopper 21 to flare radially outwardly, as shown in Figure 6. Therefore, the combined stopper and tea container, when inserted into the mouth of a thermos bottle A, shown in Figure 2, is positively locked against removal because the outwardly bent lower portion 23 of the stopper 21 engages the outwardly curved wall portion B of said thermos bottle A. To remove the stopper and container from the thermos bottle A, the sleeve 17 is unscrewed so that the cover 21 may again assume its normal cylindrical shape, as shown in Figure 5. The stopper and container may then be easily pulled out of the thermos bottle by grasping the edge of the cover 19 which projects outwardly from the stopper 21.

From the foregoing description, it will be seen that the user of the device, according to the invention, may put in the container 1 the exact amount required to make tea to the strength desired, that said tea is easily inserted into the container 1 through its bottom opening, that said container 1, being made of metal such as aluminum, is easily cleaned, and finally, that the thermos bottle can be transported in any position without the danger of having its contents spilt because the stopper can be positively locked against removal.

While a preferred embodiment according to the present invention has been illustrated and described, it is understood that various modifications may be resorted to without departing from the spirit and scope of the appended claim.

What I claim is:

In a combined tea leaf container and stopper for a vacuum vessel, said tea leaf container having a perforated cylindrical wall open at one end, a cover removably engaging said open end, a dome shaped end wall closing the other end of said container, said end wall having an annular end portion merging with said cylindrical wall, said stopper consisting in a cylindrical body of resilient material having one end in abutting engagement with said annular portion of said end wall, a disk-shaped cover member engaging the other end of said stopper, the outer cylindrical face of said stopper being provided with a plurality of spaced circularly extending grooves, said cover member having a central, recessed apertured portion, a bolt secured to said end wall of said container and extending within said rubber stopper, an inwardly threaded sleeve freely passing through said central recessed apertured portion of said cover member and threadedly engaging said bolt, and a ring member attached to the end of said sleeve projecting outwardly of said cover member and engaging the recess of said central, recessed, apertured portion of said cover member, whereby said cover member is held in engagement with said rubber stopper by said ring member and rotation of said sleeve by means of said ring will vary the distance between said cover member and said end wall to squeeze said stopper therebetween and cause outward flaring of the end portion of said stopper in engagement with said annular portion of said end wall.

References Cited in the file of this patent

UNITED STATES PATENTS

| 1,722,696 | Fowler | July 10, 1929 |

FOREIGN PATENTS

| 334,624 | Great Britain | Sept. 11, 1930 |
| 688,636 | Great Britain | Mar. 11, 1953 |

U. S. DEPARTMENT OF COMMERCE
PATENT OFFICE

CERTIFICATE OF CORRECTION

Patent No. 2,788,733  Gerard Jacques  April 16, 1957

It is hereby certified that error appears in the printed specification of the above numbered patent requiring correction and that the said Letters Patent should read as corrected below.

Column 1, lines 17, 19, 20, 22, 23, 29, 32, 38, 41, 45, 47 and 66, and column 2, lines 42, 46, 47, 51 and 59, for "thermos", in each occurrence, read -- vacuum --.

Signed and sealed this 17th day of June 1958.

(SEAL)
Attest:
KARL H. AXLINE
Attesting Officer

ROBERT C. WATSON
Commissioner of Patents